United States Patent
Angerbauer et al.

(10) Patent No.: US 12,136,704 B2
(45) Date of Patent: Nov. 5, 2024

(54) BATTERY INCLUDING BIPOLAR CELLS THAT HAVE AN EDGE INSULATING DEVICE

(71) Applicant: Robert Bosch GmbH, Stuttgart (DE)

(72) Inventors: Ralf Angerbauer, Moeglingen (DE); Bernd Schumann, Rutesheim (DE); Florian Schmid, Korntal (DE); Joerg Thielen, Briedel (DE); Christian Diessner, Muehlacker-Muehlhausen (DE); Mark Kotik, Rochester Hills, MI (US); David Naughton, Oxford, MI (US); Jerome Homann, Renningen (DE); Anne Serout, Stuttgart (DE); Laura Bauer, Altendorf (DE); Stephen Scott, Fairborn, OH (US); Dan Schneider, Orion, MI (US); Gary Mosley, Cincinnati, OH (US)

(73) Assignee: Robert Bosch GmbH, Stuttgart (DE)

( * ) Notice: Subject to any disclaimer, the term of this patent is extended or adjusted under 35 U.S.C. 154(b) by 938 days.

(21) Appl. No.: 17/054,985

(22) PCT Filed: May 17, 2019

(86) PCT No.: PCT/EP2019/062797
§ 371 (c)(1),
(2) Date: Nov. 12, 2020

(87) PCT Pub. No.: WO2019/228828
PCT Pub. Date: Dec. 5, 2019

(65) Prior Publication Data
US 2021/0218065 A1  Jul. 15, 2021

Related U.S. Application Data

(60) Provisional application No. 62/678,009, filed on May 30, 2018.

(51) Int. Cl.
 H01M 10/0562 (2010.01)
 H01M 10/0585 (2010.01)
 H01M 50/174 (2021.01)

(52) U.S. Cl.
 CPC ... H01M 10/0585 (2013.01); H01M 10/0562 (2013.01); H01M 50/174 (2021.01)

(58) Field of Classification Search
None
See application file for complete search history.

(56) References Cited

U.S. PATENT DOCUMENTS

| 7,220,516 B2 | 5/2007 | Oosawa et al. |
| 8,691,431 B2 | 4/2014 | Obika et al. |

(Continued)

FOREIGN PATENT DOCUMENTS

| JP | 2005190713 | 7/2005 |
| JP | 2005251465 | 9/2005 |
| JP | 2005259379 | 9/2005 |

OTHER PUBLICATIONS

PCT International Search Report for PCT/EP2019/062797 (2019).

*Primary Examiner* — Yoshitoshi Takeuchi
(74) *Attorney, Agent, or Firm* — Kelly McGlashen; Maginot, Moore & Beck LLP

(57) ABSTRACT

A battery includes a stacked arrangement of electrochemical cells. Each electrochemical cell is free of a cell housing and includes a bipolar plate having a substrate, a first active material layer formed on a first surface of the substrate, and a second active material layer formed on a second surface of the substrate. Each cell includes a solid electrolyte layer that encapsulates at least one of the active material layers, and an edge insulating device that is disposed between the peripheral edges of the substrates of each pair of adjacent cells. The edge insulating device physically contacts and is directly secured to one of the first surface of one cell and the solid (Continued)

FIG. 2A electrolyte layer of an adjacent cell, and is movable relative to, the other of the first surface of the one cell and the solid electrolyte layer of the adjacent cell.

10 Claims, 12 Drawing Sheets

(56) References Cited

U.S. PATENT DOCUMENTS

| | | |
|---|---|---|
| 2008/0213671 A1 | 9/2008 | Kogetsu et al. |
| 2010/0304216 A1* | 12/2010 | Ogg ................ H01M 10/0413 |
| | | 429/210 |
| 2011/0014520 A1 | 1/2011 | Ueda |
| 2011/0091770 A1 | 4/2011 | Han et al. |
| 2012/0005882 A1 | 1/2012 | Shimamura et al. |
| 2013/0344357 A1* | 12/2013 | Miyake ............. H01M 10/0585 |
| | | 29/623.2 |
| 2014/0079992 A1 | 3/2014 | Tanaka |
| 2017/0373300 A1 | 12/2017 | Maeda et al. |

\* cited by examiner

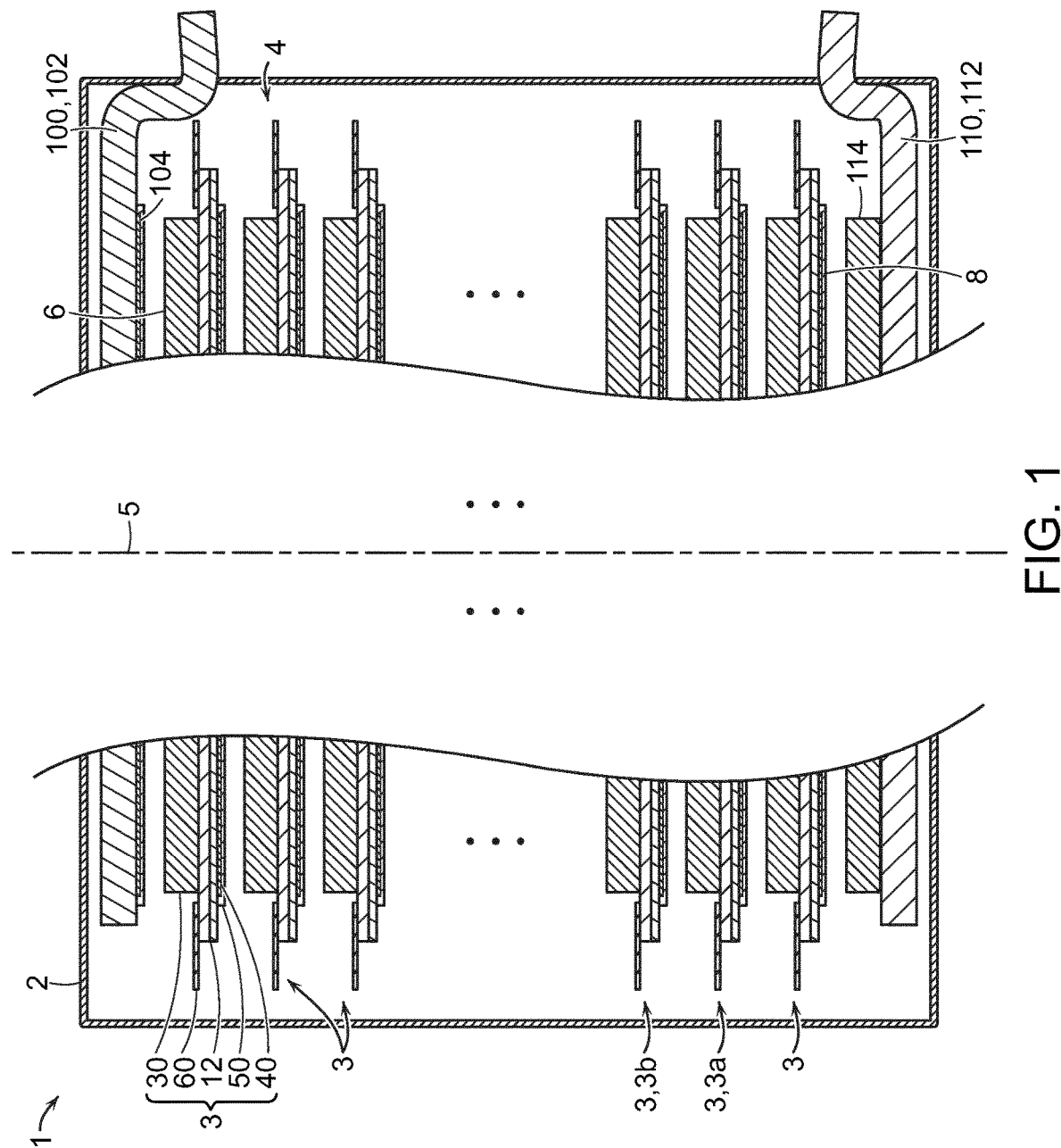

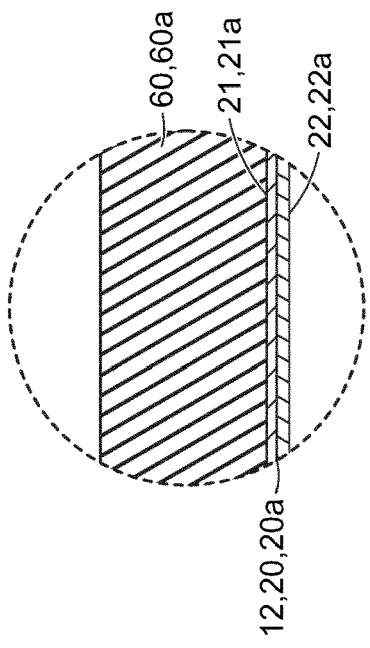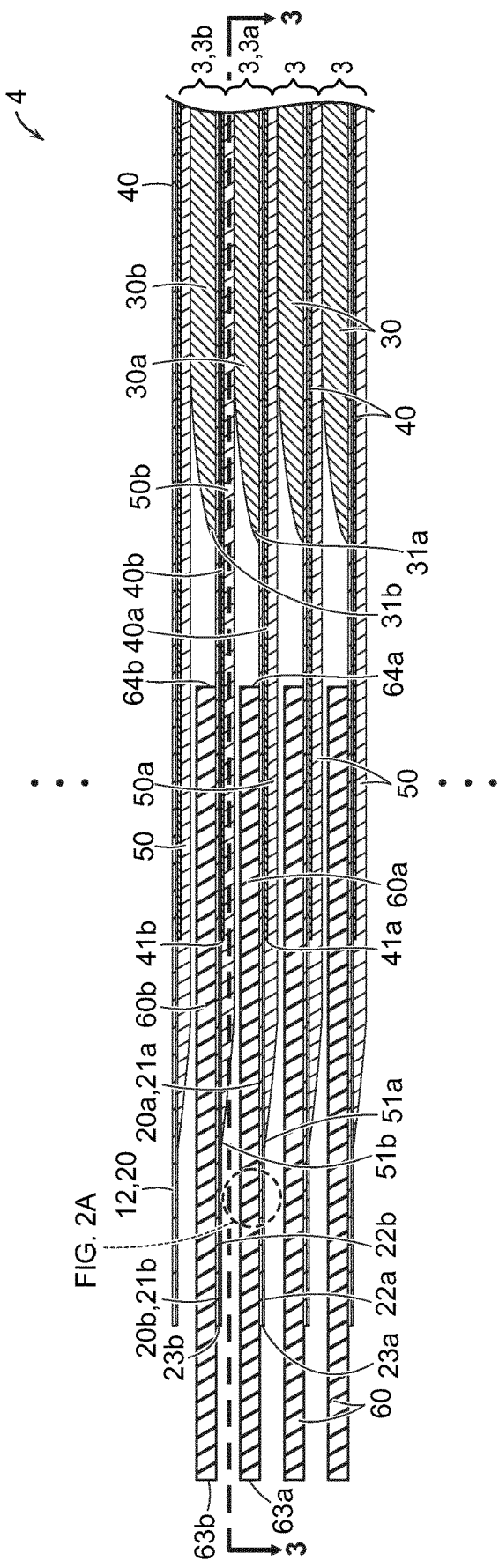

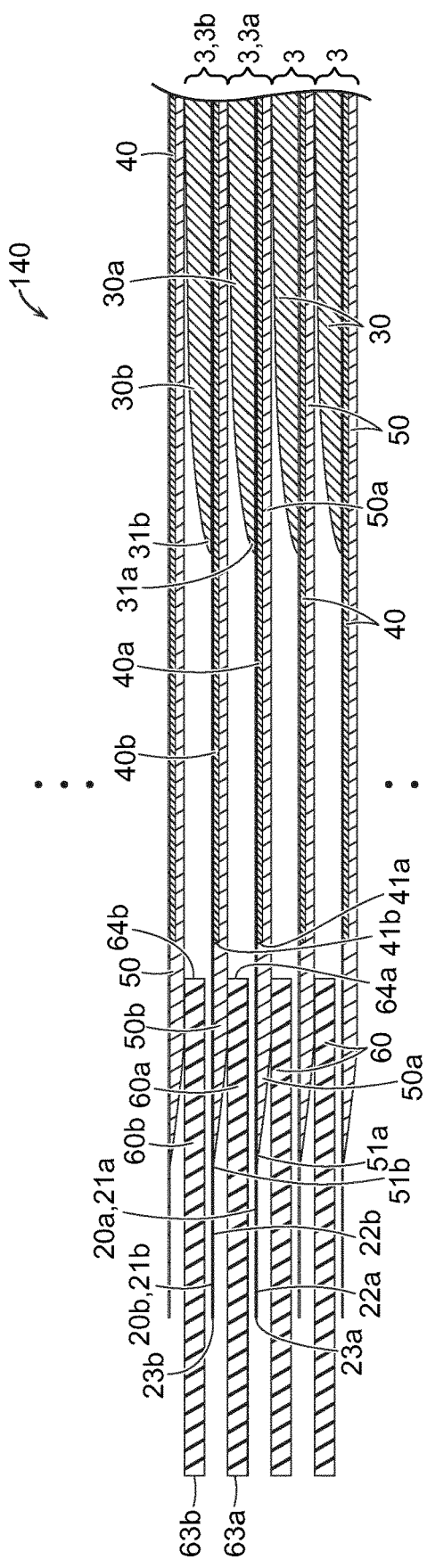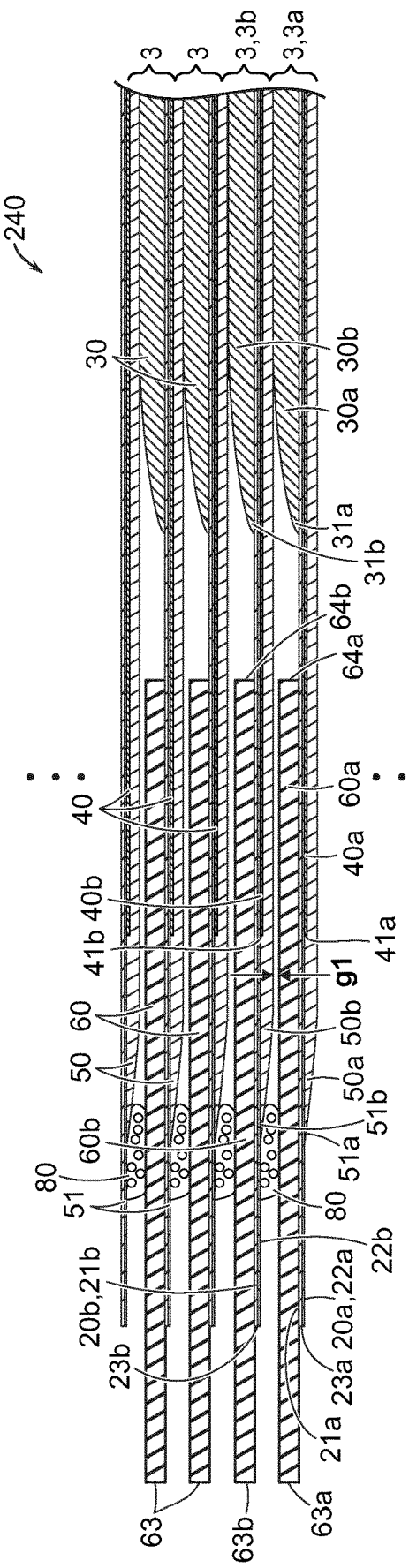

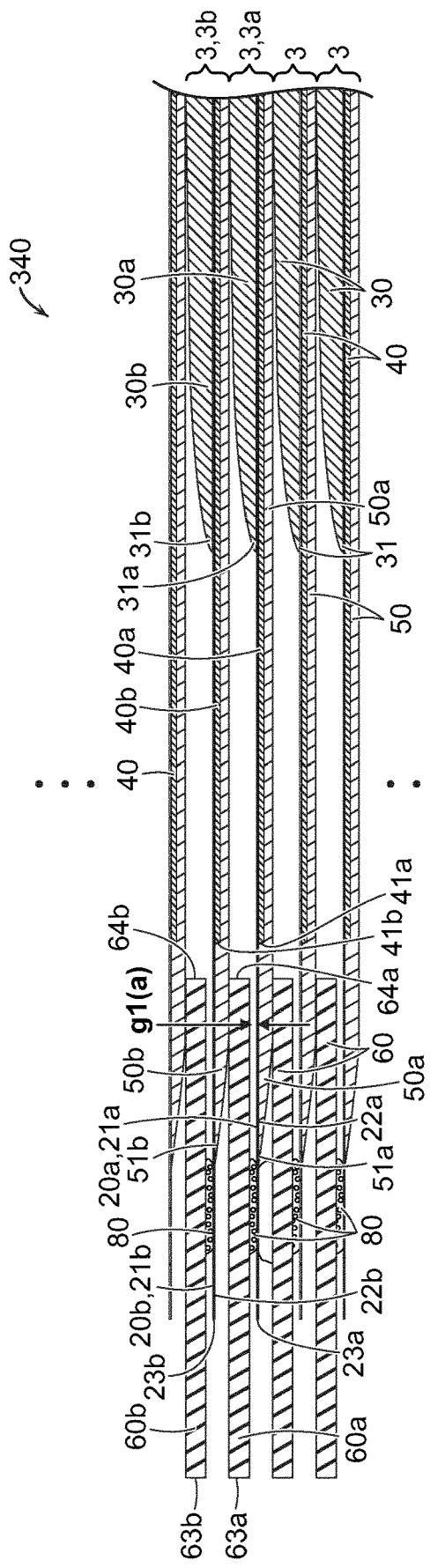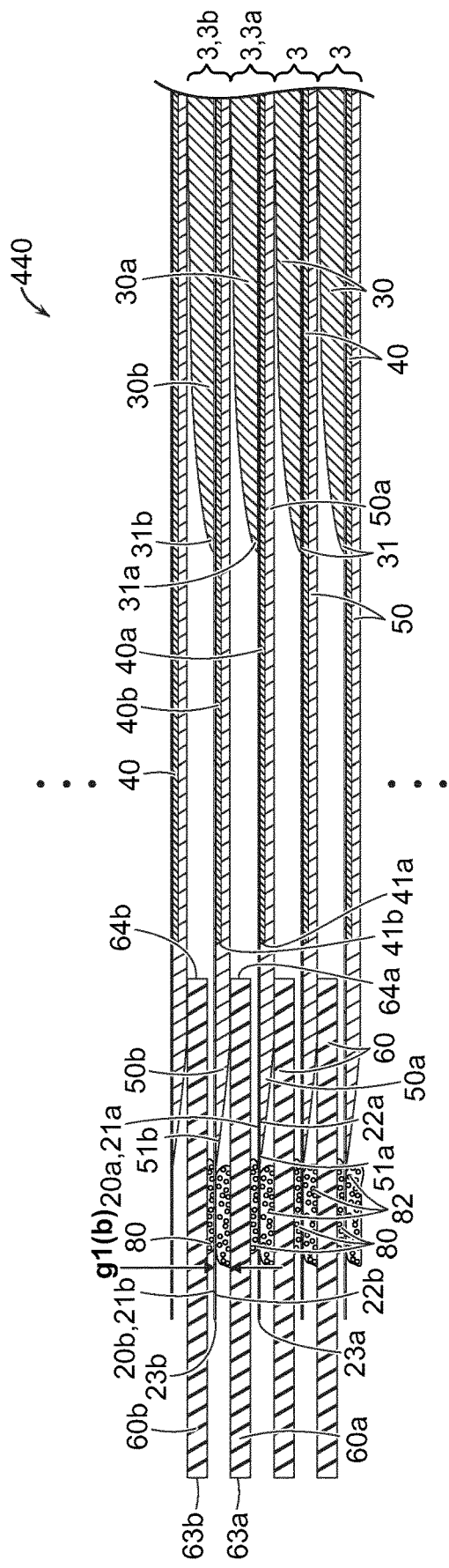

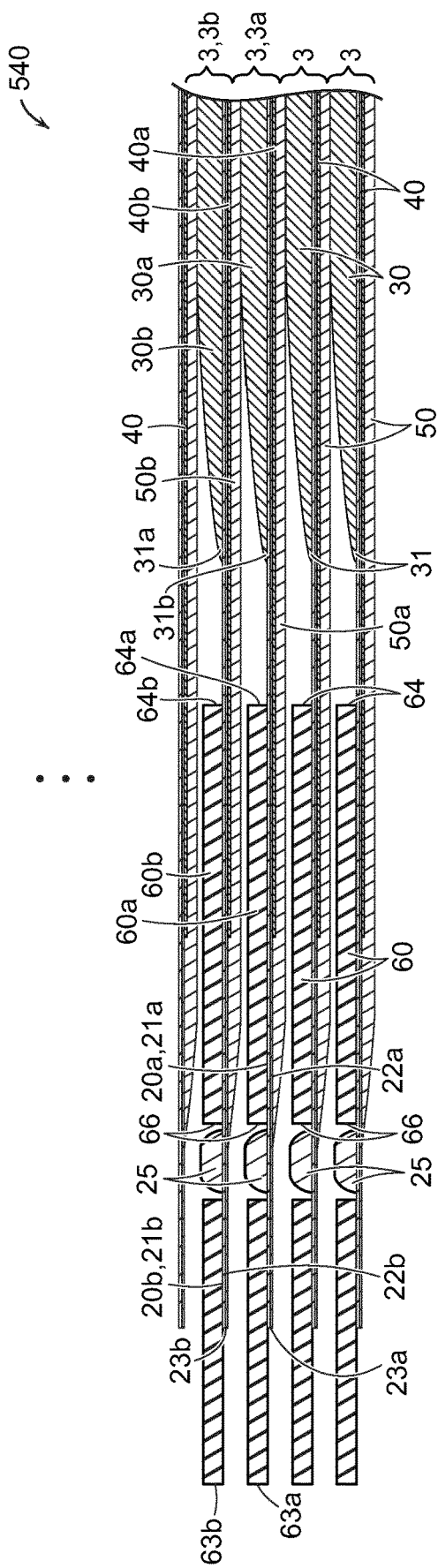
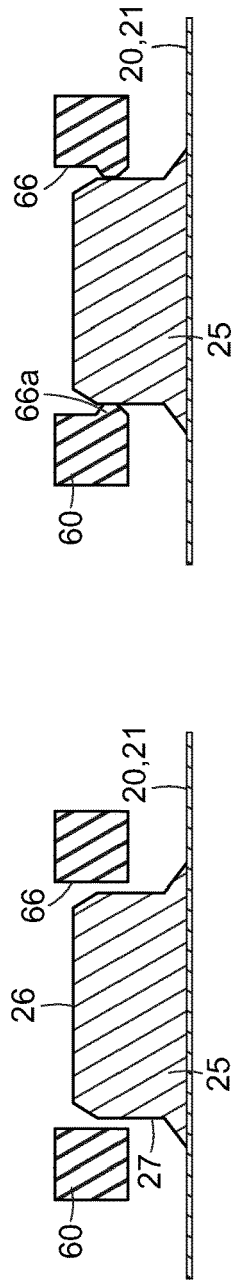
FIG. 9
FIG. 11
FIG. 10

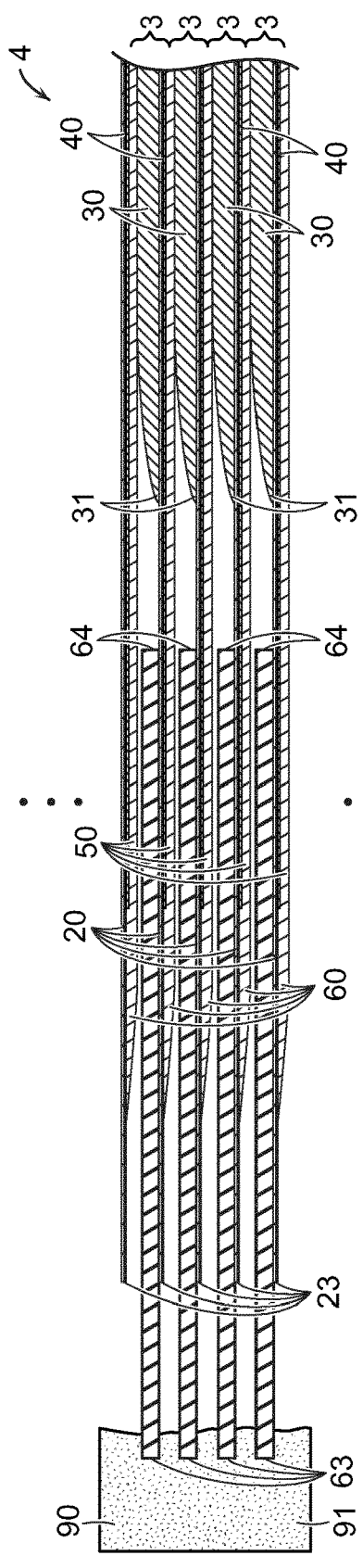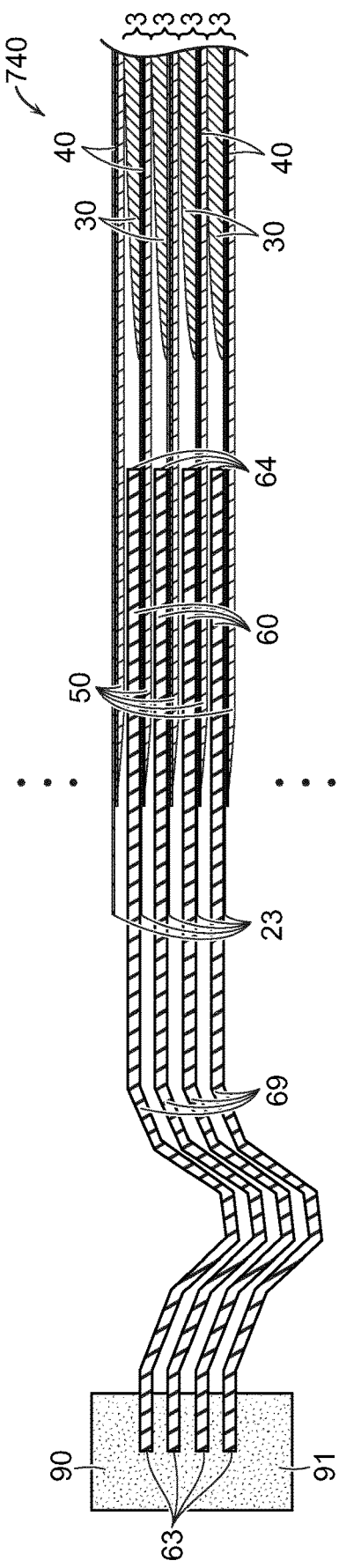

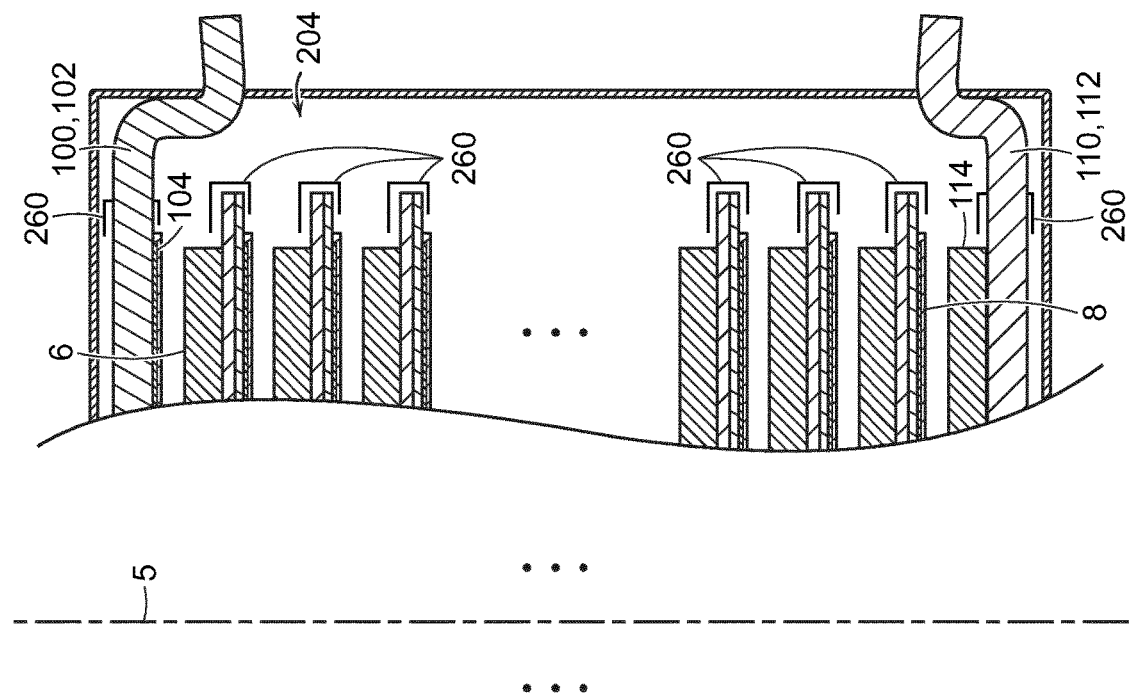
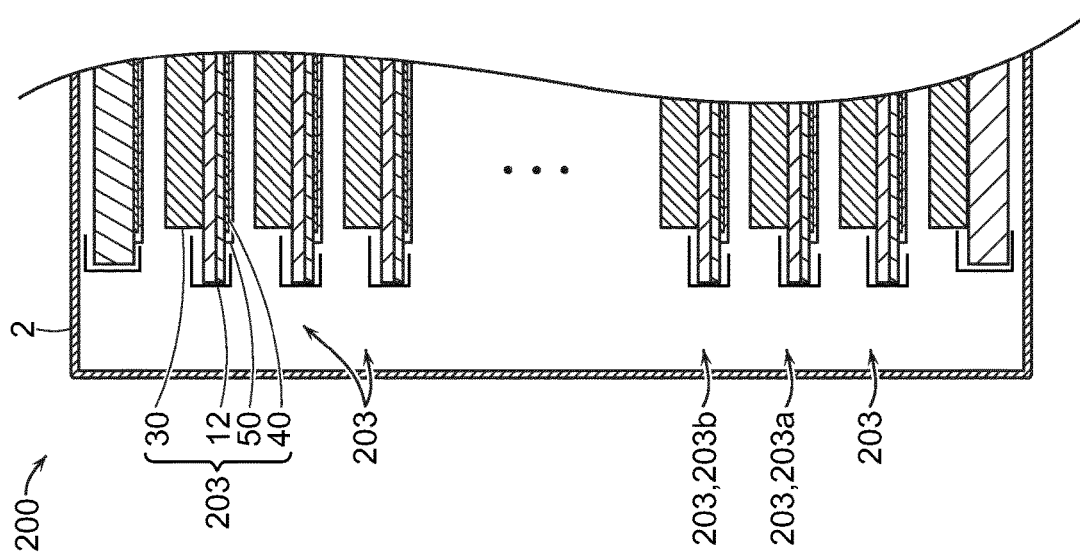
FIG. 24

BATTERY INCLUDING BIPOLAR CELLS THAT HAVE AN EDGE INSULATING DEVICE

This application is a 35 U.S.C. § 371 National Stage Application of PCT/EP2019/062797 filed on May 17, 2019, which claims the benefit of priority to U.S. Provisional Application No. 62/678,009 filed on May 30, 2018, the disclosures of which are incorporated herein by reference in their entirety.

BACKGROUND

Batteries provide power for various technologies ranging from portable electronics to renewable power systems and environmentally friendly vehicles. For example, hybrid electric vehicles (HEV) use a battery and an electric motor in conjunction with a combustion engine to increase fuel efficiency. Electric vehicles (EV) are entirely powered by an electric motor that is in turn powered by one or more batteries. The batteries may include several electrochemical cells that are arranged in two or three dimensional arrays and are electrically connected in series or in parallel. In a series connection, the positive and the negative pole of each of two or more cells are electrically connected with each other and the voltages of the cells are added to give a battery of cells with a larger voltage. For example, if n cells are electrically connected in series, the battery voltage is the voltage of a single cell multiplied by n, where n is a positive integer.

Individual cells typically are typically enclosed in a gas-impermeable housing. Often, the housing may be electrically connected to one pole of the cell. In applications where the cells are electrically connected to each other in series, for example by providing a connection between a positive pole of one cell with the negative pole of the adjacent cell, the cell voltages are additive and the housings have to be insulated from each other to prevent a short circuit. Thus, within the battery, the space used to accommodate, and materials used by, the cell housings and the corresponding insulating structures reduce battery efficiency and increase manufacturing complexity and costs.

SUMMARY

In some aspects, a battery includes a stacked arrangement of electrochemical cells. Each electrochemical cell includes a bipolar plate, a solid electrolyte layer, and an edge insulating device. The bipolar plate includes a substrate, a first active material layer disposed on a first surface of the substrate, and a second active material layer disposed on a second surface of the substrate. The second surface is opposed to the first surface. The first active material layer has a first active material layer peripheral edge that is spaced apart from, and disposed closer to a center of the substrate than, a substrate peripheral edge. The second active material layer is a material that is different than the material of the first active material layer. The second active material layer has a second active material layer peripheral edge that is spaced apart from the substrate peripheral edge. The solid electrolyte layer is disposed on the second surface so as to encapsulate the second active material layer including the second active material layer peripheral edge. The edge insulating device includes a sheet of electrically insulating material. The edge insulating device includes an outer peripheral edge and an inner peripheral edge. The edge insulating device is disposed between the peripheral edges of the substrates of a pair of adjacent cells in such a way that the outer peripheral edge is disposed further from the center of the substrate than the substrate peripheral edge. In addition, the edge insulating device physically contacts and is directly secured to the first surface of one cell of the pair of adjacent cells or the solid electrolyte layer of the other cell of the pair of adjacent cells. When the edge insulating device physically contacts and is directly secured to the first surface of the one cell of the pair of adjacent cells, the edge insulating device is movable relative to the solid electrolyte layer of other cell of the pair of adjacent cells, and when the edge insulating device physically contacts and is directly secured to the solid electrolyte layer of the other cell of the pair of adjacent cells, the edge insulating device is movable relative to the first surface of the one cell of the pair of adjacent cells.

In some embodiments, the edge insulating device is secured to the solid electrolyte layer of the other cell of the pair of adjacent cells.

In some embodiments, the edge insulating device is secured to the solid electrolyte layer of the other cell of the pair of adjacent cells via mechanical properties of an outer surface of the solid electrolyte layer.

In some embodiments, the edge insulating device is secured to the first surface.

In some embodiments, the edge insulating device is disposed between the peripheral edges of the substrates of a pair of adjacent cells in such a way that the outer peripheral edge is spaced apart from, and disposed further from the center of the substrates than, the bipolar plate peripheral edge, the inner peripheral edge is spaced apart from, and disposed closer to the center of the substrates than, the bipolar plate peripheral edge and the second active material layer peripheral edge, and the inner peripheral edge is disposed further from the center of the substrates than the first active material layer peripheral edge.

In some embodiments, the edge insulating device has the shape of a frame when viewed in a direction parallel to a stacking direction of the cells.

In some embodiments, the edge insulating device has a thickness that is less than a sum of the thicknesses of the first active material layer, the solid electrolyte layer and the second active material layer, regardless of the charge state of the cells, where the thickness corresponds to a dimension in a direction parallel to a stacking direction of the cells.

In some embodiments, the inner peripheral edge of the edge insulating device is spaced apart from and faces the first active material layer peripheral edge, and is further from the center of the substrate than the peripheral edge of the first active material layer.

In some embodiments, the battery includes a battery housing that encloses the stacked arrangement of cells, the battery housing configured to prevent humidity from entering an interior space of the battery housing.

In some embodiments, the battery housing includes a flexible laminate material, the flexible laminate material including a metal foil that is sandwiched between polymer layers.

In some embodiments, the substrate is a clad plate in which the first surface is an electrically conductive first material, and the second surface is electrically connected to the first surface and is an electrically conductive second material that is different than the first material.

In some aspects, the arrangement in which each cell is enclosed in a gas-impermeable housing is replaced by several single, housing-free electrochemical cells that are stacked so that each cell forms a direct series connection with an adjacent cell of the cell stack. Each cell has a planar shape, and includes a nearly equal sized planar anode and planar cathode separated by a separator (e.g., the anode and cathode are not wound as coil or folded in a z-fold configuration). In addition, each cell has bipolar plate between the cathode of one cell and the connected anode of an adjacent cell. In the cell stack, each cathode in the series arrangement is electrically connected to the next anode directly without an intervening housing. The bipolar plate replaces the cathodic and anodic current collector, and also prevents occurrence of a chemical reaction between the cathode active material and the anode active material. In case of lithium ion cells, the bipolar plate may include, for example, a copper foil on one side thereof that provides the anode, and an aluminum foil on an opposed side thereof that provides the cathode. The foils may be adjoining, or may provide the outermost layers of an intervening electrically conductive substrate.

In some embodiments, each electrochemical cell may have a coverage of about 3 mAh/cm$^2$ and a lithium metal anode. Upon cell charging, the lithium metal anode expands in a direction perpendicular to the layers, for example about 13-15 micrometers (μm), by generating a deposited lithium metal layer on the anode. The cell hence "breathes" (e.g., expands and contracts) between charging and discharging by about 13-15 μm.

The cells, when connected in series, are arranged having their electrode layers along with the bipolar plate quite close together. For example, the spacing of the layers may correspond to just the dimension of the cell thickness, which may be only between 40 μm to 120 μm. The bipolar plates of one cell of the cell stack and the adjacent cell are also similarly spaced. In order to avoid occurrence of a short circuit between adjacent cells of the cell stack, the bipolar plate of one cell is prevented from connecting with the bipolar plate of an adjacent cell by including an edge insulating device between adjacent cells. More particularly, the edge insulating device is disposed between the peripheral edges of the bipolar plates of adjacent cells. The edge insulating device is formed of an electrically insulating material and functions to electrically insulate each cell from the adjacent cells, while still allowing the cells to expand or shrink upon cycling without the edge insulating device or the cell itself being damaged.

In some aspects, an edge area of the edge insulating device may be secured to one of the anode side and cathode side of the bipolar plate. The insulating function of the edge insulating device is directly given by the mechanically insertion of the device between the elements to be isolated. The edge insulating device prevents any external part from mechanical and electrical contact with the bipolar plates, the electrodes and electrolytes. The edge insulating device is secured to only one of the one of the anode side and cathode side of the bipolar plate, and is detached from the other of the of the anode side and cathode side of the bipolar plate. For example, in some embodiments, the edge insulating device is secured to the cathode side (e.g., the same side of the bipolar plate as the cathode active material layer), and is not secured to any component of the adjacent cell. In other embodiments, the edge insulating device is secured to a peripheral portion of the solid electrolyte that overlies the anode active material layer, and thus is not directly secured to the bipolar plates between which it resides.

The details of one or more features, aspects, implementations, and advantages of this disclosure are set forth in the accompanying drawings, the detailed description, and the claims below.

BRIEF DESCRIPTION OF THE DRAWINGS

FIG. 1 is a schematic cross-sectional view of a battery including battery housing and a cell stack disposed in the battery housing.

FIG. 2 is a cross-sectional view of a peripheral portion of the cell stack of FIG. 1.

FIG. 2a is an enlargement of a portion of a cell, the portion identified in FIG. 2 by broken lines.

FIG. 5 is a cross-sectional view of a peripheral portion of an alternative embodiment cell stack.

FIG. 6 is a cross-sectional view of a peripheral portion of another alternative embodiment cell stack.

FIG. 7 is a cross-sectional view of a peripheral portion of another alternative embodiment cell stack.

FIG. 8 is a cross-sectional view of a peripheral portion of another alternative embodiment cell stack.

FIG. 9 is a cross-sectional view of a peripheral portion of another alternative embodiment cell stack.

FIG. 10 is a cross-sectional view of an enlarged portion of the cell stack of FIG. 9 illustrating an embodiment of a substrate surface feature.

FIG. 11 is a cross-sectional view of an enlarged portion of the cell stack of FIG. 9 illustrating another embodiment of a substrate surface feature.

FIG. 20 is a cross-sectional view of a peripheral portion of the cell stack of FIG. 1 illustrating a support frame.

FIG. 21 is a cross-sectional view of a peripheral portion portion of an alternative embodiment cell stack illustrating the support frame of FIG. 20.

FIG. 24 is a schematic cross-sectional view of an alternative embodiment battery including battery housing and a cell stack disposed in the battery housing.

DETAILED DESCRIPTION

Figure 3:
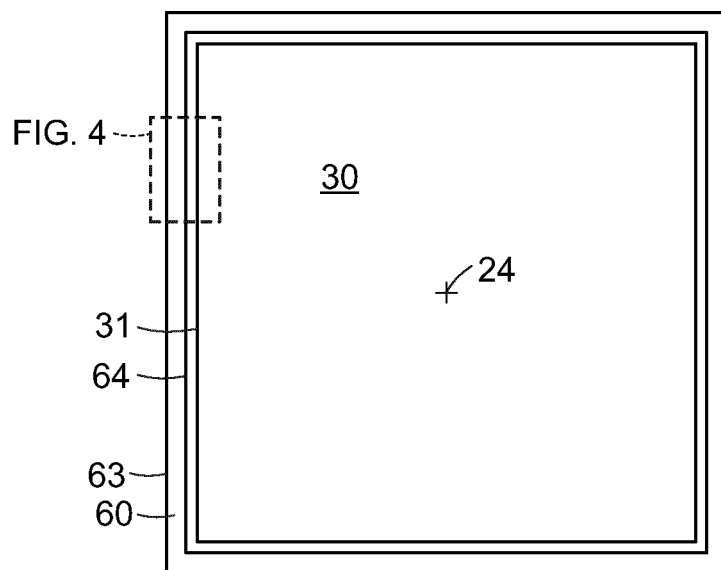
FIG. 3 is a cross-sectional view of the cell stack of FIG. 1 as seen along line 3-3 of FIG. 2.
Figure 4:
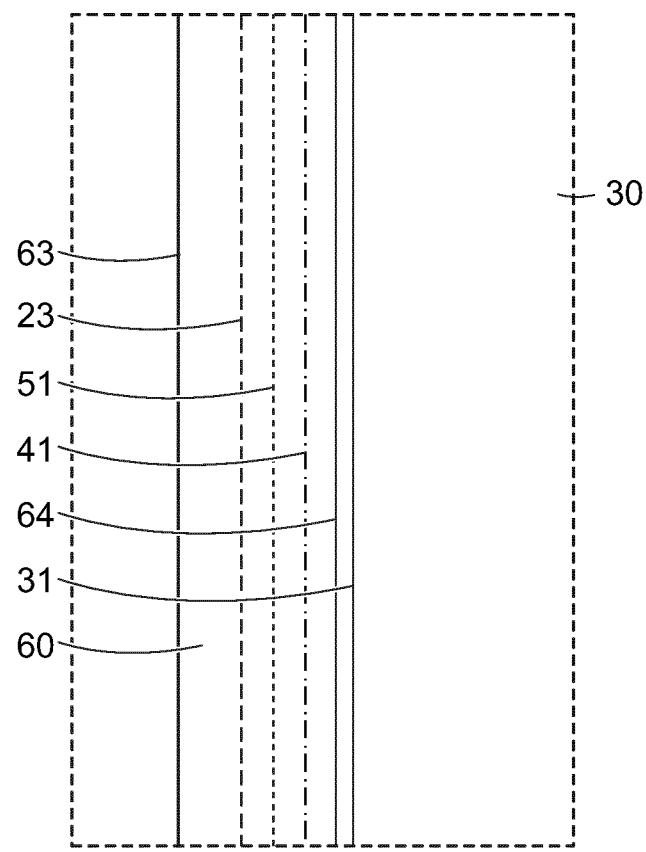
FIG. 4 is an enlarged view of a portion of a cell stack, the portion identified in FIG. 3 by broken lines.
Figure 12:
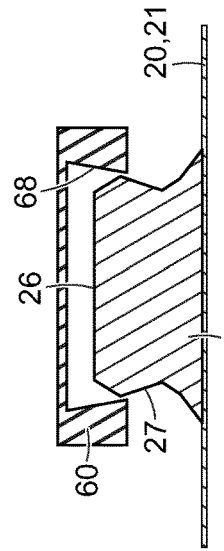
FIG. 12 is a cross-sectional view of an enlarged portion of the cell stack of FIG. 9 illustrating another embodiment of a substrate surface feature.
Figure 13:
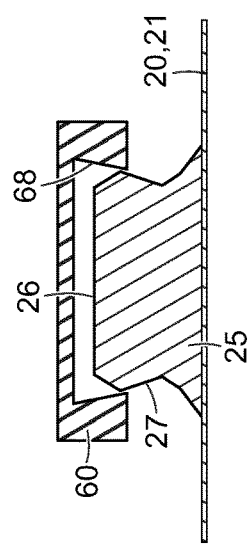
FIG. 13 is a cross-sectional view of an enlarged portion of the cell stack of FIG. 9 illustrating another embodiment of a substrate surface feature.

Referring to FIG. 1, a battery 1 is a power generation and storage device that includes a battery housing 2 that encloses a stacked arrangement of electrochemical cells 3. The battery housing 2 is configured so that air, moisture and/or other contaminants are prevented from entering the interior space that contains the cells 3. For example, in some embodiments, the battery housing 2 is formed of a flexible laminate material that includes a metal foil that is sandwiched between polymer layers, and that is provided in the form of a sealed pouch.

The cells 3 may be lithium-ion secondary cells, but are not limited to a lithium-ion cell chemistry. The cells 3 are free of a cell housing, have a generally planar, low-profile shape and are stacked along a stack axis 5 so that each cell 3a forms a direct series connection with an adjacent cell 3b of the cell stack 4. Each cell 3 includes a bipolar plate 12 having active material layers 30, 40 provided on opposed surfaces thereof, a solid electrolyte layer 50 that permits ion exchange between adjacent cells 3a, 3b while preventing electrical contact between the active material layers 30, 40 of adjacent cells 3a, 3b, and an edge insulating device 60. In FIG. 1 and in other figures, due to the thinness of the material layers that constitute the cells 3, the constituents of the cells 3 are shown schematically and are not to scale.

The edge insulating device 60 is disposed between the peripheral edges 15 of the bipolar plates 12 of adjacent cells 3a, 3b, and functions to electrically insulate the bipolar plate 15a of one cell 3a from the bipolar plate 15b of the adjacent cell 3b, while still allowing the cell 3 to expand or shrink upon cycling without the edge insulating device 60 or the cell 3 itself being damaged. The edge insulating device 60 may be retained in a desired position relative to the bipolar plate peripheral edge 15 by cooperation between surface features provided on the bipolar plate and the edge insulating device, as discussed in further detail below. Each cell may further include an elastic seal device 80 that is configured to seal a gap g1 between the edge insulating device 60 and the adjacent cell 3b, whereby air and moisture are further prevented from entering the cell 3, as discussed further below. In addition, in some embodiments, the battery 1 may include an edge support frame 90 that receives and supports the outer peripheral edge 63 of each edge insulating device, as discussed further below.

Referring to FIG. 2, a portion of a periphery of the cell stack 4 is shown. In this figure and other figures, only four complete cells 3 of the cell stack 4 are shown, and ellipses above and/or below the illustrated cells 3 are used to indicate additional cells reside on one or both sides of the illustrated cells. As seen in FIG. 2, the bipolar plate 12 includes a plate-like substrate 20, a first active material layer 30 that is formed on a first surface 21 of the substrate 20 and provides a cathode, and a second active material layer 40 that is formed on a second, opposed surface 22 of the substrate 20 and provides an anode.

The substrate 20 is an electrical conductor and an ion insulator, and may be a clad plate that has a first metal foil on one side thereof that provides the first surface 21, and second metal foil on an opposed side thereof that provides the second surface 22. When the cell 3 employs lithium ion cell chemistry, the substrate 20 may include, for example, an aluminum foil on one side that provides the cathode substrate, and a copper foil on the opposed side that provides the anode substrate. In some embodiments, the foils may be adjoining. For example, the substrate 20 can be realized by providing a copper foil and having aluminum evaporated or plated on one side, or alternatively, by providing an aluminum foil and having copper evaporated or plated on one side. In other embodiments, the substrate 20 may be a clad plate that is formed of other pairs of electrically conductive materials and/or formed via other appropriate techniques.

In still other embodiments, the substrate 20 may include metal foils that form the opposed, outermost layers of an intervening electrically conductive substrate.

In still other embodiments, the substrate 20 may be a solid (e.g., non-clad and formed of a single material) plate that is formed of an electrically conductive material. For example, in some embodiments, the substrate 20 may be a solid nickel foil or a solid stainless steel foil.

The first active material layer 30 is formed on the substrate first surface 21. The first active material layer 30 is formed of an active material. As used herein, the term "active material" refers to an electrochemically active material within the cell that participates in the electrochemical reactions of charge or discharge. The first active material layer 30 has a first active material layer peripheral edge 31 that is spaced apart from, and disposed closer to a center 24 of the substrate 20 than, a peripheral edge 23 of the substrate 20. In embodiments where the first surface 21 is formed of aluminum, the first active material layer 30 may be formed of, for example, a lithiated metal oxide, where the metal portion of the lithiated metal oxide can be cobalt, manganese, nickel, or a complex of the three.

The second active material layer 40 is formed on the substrate second surface 22. The second active material layer 40 is formed of a different active material than the active material used to form the first active material layer 30. The second active material layer 40 has a second active material layer peripheral edge 41 that is spaced apart from the substrate peripheral edge 23. In particular, the second active material layer peripheral edge 41 is not aligned with the first active material layer peripheral edge 31 along an axis parallel to the stack axis 5 in order to avoid edge effects and current concentration at the edge of the anode. To this end, the second active material layer peripheral edge 41 is disposed closer to a center 24 of the substrate 20 than the substrate peripheral edge 23, and is disposed between the substrate peripheral edge 23 and the first active material layer peripheral edge 31. In embodiments where the second surface 22 is formed of copper, the second active material layer 40 may be formed of, for example, lithium metal.

The solid electrolyte layer 50 is formed of a solid electrolyte, e.g., a solid material that is ionically conductive and electrically insulative, and may be provided as a film. The solid electrolyte layer 50 is disposed on the second surface 22 in such a way as to encapsulate the second active material layer 40 including the second active material layer peripheral edge 41. As a result, the solid electrolyte layer 50 is configured to prevent the second active material layer 40 from coming into contact with air and moisture, and prevents contact with the cathode material. In addition, the solid electrolyte layer 50 acts as the ionic conductor between the first active material layer 30 of one cell 3a and the second active material layer 40 of the adjacent cell 3b. In some embodiments, the solid electrolyte layer 50 may be formed, for example, of a solid polymer electrolyte that includes a polymer similar to the polymer used to form the active material layers 30, 40, a salt identical to the salt used to form the active material layers 30, 40, and an additive such as is sold under the name DryLyte™ by Seeo, Incorporated of Hayward, Calif. In other embodiments, the solid polymer electrolyte layer 50 may be formed of other materials, including ceramics or a mix of ceramic and polymer materials.

Referring again to FIG. 1, the battery 1 includes a negative end terminal 100 disposed at one end (e.g., a first end 6) of the cell stack 4 that is electrically connected to the outermost cell 3 at the first end 6 of the cell stack 4. In addition, the battery 1 includes a positive end terminal 110 disposed at the opposed end (e.g., second end 8) of the cell stack 4. The positive end terminal 110 is electrically connected to the outermost cell 3 at the second end 8 of the cell stack 4.

The negative end terminal 100 includes an electrically conductive sheet (for example, a copper sheet) that serves as a negative current collector 102, and a negative current collector active material layer 104 formed on the cell stack-facing surface of the negative current collector 102. The negative current collector active material layer 104 employs that same active material layer used to form the anodes of the cell 3. In the illustrated embodiment directed to a lithium-ion cell chemistry, the negative current collector active material layer 104 may be, for example, lithium metal that is encapsulated in solid electrolyte material. In use, the negative end terminal 100 is stacked onto the first end 8 of the cell stack 4 so that the negative current collector active material layer 104 is in direct contact with, and forms an electrical connection with, the first active material layer 30 of the outermost cell of the first end 6 of the cell stack 4.

The positive end terminal 110 includes an electrically conductive sheet (for example, an aluminum sheet) that serves as a positive current collector 112, and a positive current collector active material layer 114 formed on the cell stack-facing surface of the positive current collector 112. The positive current collector active material layer 114 employs that same active material layer used to form the cathodes of the cell 3. In the illustrated embodiment directed to a lithium-ion cell chemistry, the positive current collector active material layer 114 may be, for example, a lithiated metal oxide. In use, the positive end terminal 110 is stacked onto the second end 8 of the cell stack 4 so that the positive current collector active material layer 114 is in direct contact with the solid electrolyte layer 50 of the outermost cell 3 of the second end of the cell stack 4. The positive current collector active material layer 114 forms an electrical connection with the second active material layer 40 (e.g., the lithium metal anode) of the outermost cell 3 of the second end of the cell stack 4 via the solid electrolyte layer 50.

Referring to FIGS. 2-5, the edge insulating device 60 is formed of a sheet of electrically insulating material, and includes an outer peripheral edge 63 and an inner peripheral edge 64 that is surrounded by, and spaced apart from, the outer peripheral edge 63. As a result, the edge insulating device 60 has the shape of a frame when viewed in a direction parallel to the stacking direction of the cells 3.

An edge sealing device 60 is provided for each cell 3, and is disposed between the peripheral edges 23a, 23b of the bipolar plate substrates 20 of adjacent cells 3a, 3b. Within each cell 3, the outer peripheral edge 63 is spaced apart from, and disposed further from the center 24 of the substrate 20 than, the substrate peripheral edge 23. The inner peripheral edge 64 is spaced apart from, and disposed closer to the center 24 of the substrate 20 than, the substrate peripheral edge 23 and the second active material layer peripheral edge 41. In addition, the inner peripheral edge 64 is disposed further from the center 24 of the substrate 20 than the first active material layer peripheral edge 31, whereby the inner peripheral edge 64 is spaced apart from, and faces, the first active material layer peripheral edge 31.

While being disposed between the substrates 20a, 20b of each pair of adjacent cells 3a, 3b, the edge insulating device 60 physically contacts, and is directly secured to, either the first surface 21a of one cell (e.g., cell 3a) or the solid electrolyte layer 50b of an adjacent cell (e.g., cell 3b), while being free to move relative to the other of the first surface 21a of the cell 3a and the solid electrolyte layer 50b of the adjacent cell 3b.

For example, in some embodiments, the edge insulating device 60 physically contacts, and is directly secured to, the first surface 21a of one cell 3a, while being free to move relative to the adjacent cell 3b, and more particularly is free to move relative to the solid electrolyte layer 50b of the adjacent cell 3b (FIG. 2). The edge insulating device 60 is secured to the first surface 21a of the cell 3a using any appropriate method, such as by providing an adhesive layer between these elements.

In other embodiments, the edge insulating device 60 physically contacts, and is directly secured to, the solid electrolyte layer 50b of the adjacent cell 3b, while being free to move relative to the first surface 21a of the cell 3a (FIG. 5). The edge insulating device 60 may be secured to the solid electrolyte layer 50b of the adjacent cell 3b via the mechanical properties (e.g., adhesiveness or stickiness) of the outer surface of the solid electrolyte layer 50b, or may be secured to the solid electrolyte layer 50b of the adjacent cell 3b via other methods, such as by providing an adhesive layer between these elements.

Since the edge insulating device 60 (in this case, 60a) is fixed to one cell and movable relative to the other cell, the cells 3a, 3b are permitted to freely expand and contract in a direction parallel to the stack axis 5, for example due to charge cycling, and the edge insulating device 60 and the cells 3a, 3b remain undamaged despite the relative motion of one cell with respect to another, and relative motion of the edge insulating device relative to the adjacent cells 3a, 3b.

The edge insulating device 60 overlaps the peripheral edge 23 of the substrate 20 of the bipolar plate 12 with the outer peripheral edge 63 disposed outward from the cell 3. The distance of the outer peripheral edge 63 from the substrate peripheral edge 23 is large enough that even on some deforming forces the bipolar plates of different cells can never touch each other and form a short circuit, thus the a large current and heat generation associated with a short circuit is avoided. In some embodiments, the distance of the outer peripheral edge 63 from the substrate peripheral edge 23 may be 3 to 20 times or more the cell thickness. As used here, the term "thickness" corresponds to a dimension in a direction parallel to a stacking direction of the cells.

The edge insulating device 60 overlaps the peripheral edge 23 of the substrate 20 of the bipolar plate 12 with the inner peripheral edge 66 disposed inside the cell 3. The distance of the inner peripheral edge 63 from the substrate peripheral edge 23 is sufficient to place the inner peripheral edge 63 as close as possible to the first active material layer peripheral edge 31 while preventing contact between the edge insulating device 60 and the first active material layer peripheral edge 31. The spacing or gap g2 between the inner peripheral edge 66 of the edge insulating device 60 and the first active material layer peripheral edge 31 depends on the edge tolerance resulting from the method of forming the first active material layer 30 on the substrate first side 21, which may be, for example, a patch process. In some embodiments, the distance of the inner peripheral edge 64 from the first active material layer peripheral edge 31 (gap g2) is set to be about twice the edge tolerance. For example, if the tolerance of the patch process is about 0.15 mm, the distance of the inner peripheral edge 63 from the first active material layer peripheral edge 31 is set to be about 0.3 mm.

In general, the edge insulating device 60 has a thickness that is less than the thickness of the cell 3 regardless of the charge status of the cell. In some embodiments, the edge insulating device 60 has a thickness that is less than a sum of the thicknesses of the first active material layer 30, the solid electrolyte layer 50 and the second active material layer 40, regardless of the charge state of the cells 3. This is the case for embodiments in which the edge insulating device 60 is fixed to the first surface 21 of the bipolar plate 12, and for embodiments in which the edge insulating device 60 is fixed to the solid electrolyte layer 50. For example, if the charged cell has a thickness without bipolar plates of 80 µm and the discharged cell has a thickness of 65 µm, the edge insulating device 60 should have a thickness that is 3-10 µm less than the thinnest, here 65 µm thickness. Thus, the edge insulating device 60 should have a thickness in this example of less than 62 µm, especially less than 55 µm. It is understood that the thickness of the edge sealing device includes a glue layer or any other fixing assembly required.

In some embodiments the edge insulating device 60 is provided as a tape or strip. The tape may be applied first along two parallel edges of the cell, and subsequently along the transverse parallel edges. This method of application results in a double thickness of tape at each corner of the cell. In other embodiments, and when the cell is rectangular in profile, the edge insulating device is simply 90° folded to accommodate the rectangular circumferential edge. This also results in a double thickness of the edge sealing device at corners of the cell. The thickness dimension at the corners of the cell is taken into account when determining thickness requirements of the edge insulating device 60, in that the double thickness portions of the edge insulating device 60 should also be thinner than the cell in any status of charge.

During manufacture of the cell stack 4, if the cells are laminated it may be difficult to insert the edge insulating device 60 into the gap between cells 3. For this reason, in some embodiments, before stacking the cells 3, the edge insulating device 60 is previously glued on or otherwise assembled with the bipolar plate.

The edge insulating device 60 functions to electrically insulate the peripheral edges of the cell from one another. To this end, the materials used to form the edge insulating device 60 may be an insulating polymer film that does not swell. Such materials may include, for example, polyalkylene films, or any other known sealing material which is highly insulating and not hygroscopic. Other exemplary materials include fluoro-alkylene type polymers, polystyrene type polymers, polyphenylenesulfides, polyethylene terephthalates, polyimides, polyacrylates, polyetherimids, polytetrafluoroethylenes, silicones or combinations thereof.

Referring to FIGS. 6-8, as previously discussed, the edge insulating device 60 physically contacts, and is directly secured to, either the first surface 21a of one cell (e.g., cell 3a) or the solid electrolyte layer 50b of an adjacent cell (e.g., cell 3b), while being free to move relative to the other of the first surface 21a of the cell 3a and the solid electrolyte layer 50b of the adjacent cell 3b. In some embodiments, a gap g1 is provided between the edge insulating device 60 and the structure with which it relatively moves freely. For example, when the edge insulating device 60 physically contacts, and is directly secured to, the first surface 21a of one cell 3a, while being free to move relative to the solid electrolyte layer 50b of the adjacent cell 3b, the gap g1 may be provided between the edge insulating device 60 and the solid electrolyte layer 50b.

In some embodiments, each cell includes an elastic seal device 80 in addition to the edge insulating device 60. The seal device 80 provides a moisture impermeable seal about a periphery of the cell 3. In embodiments in which the edge insulating device 60 physically contacts, and is directly secured to, the first surface 21a of one cell 3a, while being free to move relative to the solid electrolyte layer 50b of the adjacent cell 3b, the seal device 80 is disposed in the gap g1 between the edge insulating device 60 and the solid electrolyte layer 50b of the adjacent cell 3b (FIG. 6). More specifically, the seal device 80 is disposed between, and directly physically contacts, the edge insulating device 60 and the solid electrolyte layer 50b. In this configuration, the seal device 80 may cover a part of the solid electrolyte layer 50b (e.g., a peripheral edge 51 thereof) as well as the edge insulating device 60, and forms a seal with each of the solid electrolyte layer 50b and the edge insulating device 60. As a result, the seal device 80 provides a bather that prevents moisture and other contaminants from contacting the solid electrolyte layer 50b and the electrochemically active materials. In addition, due to the elasticity the seal device 80 and since the seal device 80 adjoins the solid electrolyte layer peripheral edge 51, the seal device 80 may apply an outward force that compresses the peripheral edge 51 and serves to prevent the electrolyte layer 50b from peeling away from its substrate 20b.

In embodiments in which the edge insulating device 60 physically contacts, and is directly secured to, the solid electrolyte layer 50b of the adjacent cell 3b, while being free to move relative to the first surface 21a of the cell 3a, the seal device 80 is disposed in the gap g1(a) between the edge insulating device 60 and the first surface 21a of the cell 3a (FIG. 7). More specifically, the seal device 80 forms a seal with each of the edge insulating device 60 and the first surface 21a of the cell 3a. In some embodiments, a second seal device 82 may be disposed in the gap g1(b) between the edge insulating device 60 and the second surface 22b of the adjacent cell 3b (FIG. 8). The second seal 82 directly physically contacts, and forms a seal with, both an opposed side of the edge insulating device 60 and the second surface 22b of the substrate 20b of the adjacent cell 3b. This configuration may advantageously effectively adhere the adjacent cells 3a, 3b together via the two seal devices 80, 82.

The seal devices 80, 82 provide impermeability by closing the gap g1 between the edge insulating device 60 and the bipolar plate 12b of the adjacent cell 3b. The seal device 80 may be provided, for example, in the form of a strip of an elastic material, or in the form of a closed pore elastic foam or polymer that is printed or glued on the edge insulating device. The seal devices 80, 82 may extend about the circumference of the cell 3, whereby the seal devices 80, 82 may have the shape of a frame when viewed in a direction parallel to a stacking direction of the cells 3.

The seal devices 80, 82 have elastic properties that allow them to compensate for cell dimensional changes in a direction parallel to the stack axis 5 including the expansion and contraction associated with charge cycling. Since the amount of expansion or contraction can correspond to up to 10 percent or more of cell thickness, the seal devices 80, 82 must be sufficiently elastic to maintain the seal despite the cell dimensional changes.

In addition to being sufficiently elastic to accommodate cell expansion and contraction due to charge cycling, the material used to form the seal devices 80, 82 must also be impervious to moisture. In some embodiments, the seal devices 80, 82 may be a closed-pore elastic foam rubber in which the pore fraction of the closed pore elastic foam is sufficient to compensate for an expansion and contraction of the cell 3 of up to 10 percent or more of cell thickness. In other embodiments, the seal devices 80, 82 may be formed of other materials that address the requirements of the specific application, including, but not limited to, an open-cell foam rubber.

Use of the seal devices 80, 82 is also advantageous in cell stacks having liquid electrolytes or gel-type electrolytes. In some embodiments, it is adequate to provide the edge insulating device with an additional seal in the form of an elastic or closed pore elastic foam or rubber type polymer film on the top side of the edge insulating device.

Referring to FIGS. 9-13, as previously discussed, the edge insulating device inner peripheral edge 64 is spaced apart from the first active material layer peripheral edge 31 in a direction transverse to the stack axis 5 in order to avoid any collision between these components, since such a collision could possibly damage the first active material layer 30. In some embodiments, the substrate 20 of the bipolar plate 12 may include surface features that engage the edge insulating device 60 in such a way as to locate the edge insulating device 60 relative to the substrate 20, thereby ensuring that the spacing is maintained between the edge insulating device inner peripheral edge 64 and the first active material layer peripheral edge 31.

For example, the first surface 21 of the substrate 20 may include a protrusion 25 that protrudes outward from the first surface 21 in a direction normal to the first surface 21 (FIG. 9). The protrusion 25 may have a circular or oval profile when viewed in a direction parallel to the stack axis 5. In addition, the protrusion 25 may include an end face 26 and a sidewall 27 that extends between the end face 26 and the substrate first surface 21. The protrusion 25 is positioned along the first surface 21 at a location between the substrate peripheral edge 23 and the inner peripheral edge 64 of the edge insulating device 60. The edge insulating device 60 may include a corresponding feature such as a through hole 66 (FIGS. 10 and 11) or a recess 68 (FIGS. 12 and 13) that is shaped and dimensioned to receive the protrusion 25. The through hole 66 extends between opposed broad surfaces of the edge insulating device 60, and is disposed at a location spaced apart from the outer peripheral edge 63 and the inner peripheral edge 64. When the protrusion 25 and the through hole 66 are engaged, the edge insulating device 60 is located and retained relative to the substrate 20 such that the spacing is maintained between the edge insulating device inner peripheral edge 64 and the first active material layer peripheral edge 31. In cases where a recess 68 replaces the through hole 66, it is understood that the recess 68 is similar in form and function to the through hole 66, but extends only partially through the thickness of the edge insulating device 60.

In some embodiments, the protrusion 25 may be received within the through hole 66 or recess 68 with a tolerance fit. Alternatively, the protrusion 25 may be received within the through hole 66 or recess 68 with a press fit. In these embodiments, the protrusion sidewall 27 is linear and perpendicular to the substrate first surface 21. The edge insulating device through hole 66 or recess 68 includes an inner surface 67 that may be linear and perpendicular to the opposed broad surfaces of the edge insulating device 60 (FIG. 10), or alternatively may include surface features 66a that engage the protrusion sidewall 27 (FIG. 11).

In some embodiments, the protrusion 25 and/or the through hole 66 or recess 68 are shaped and/or dimensioned to provide a "snap in" or "click-in" mechanical connection therebetween. In these embodiments, the protrusion sidewall 27 may have a non-linear profile, the inner surface 67 of the through hole 66 or recess 68 may have a non-linear profile that complements the non-linear profile of the protrusion sidewall 27, and the protrusion 25 is engaged with the through hole 66 via a snap fit engagement between the protrusion sidewall 27 and the through hole inner surface 67. In the example illustrated in FIG. 12, the protrusion sidewall 27 and the recess inner surface 67 have complimentary shapes and sizes that are each angled relative to the substrate first surface 21. In addition, the recess opening is dimensioned to be smaller than the widest dimension of the protrusion 25, whereby the protrusion 25 is snapped or clicked into engagement with the recess inner surface 67. In the example illustrated in FIG. 13, the protrusion sidewall 27 and the recess inner surface 67 have complimentary shapes in a manner similar to that of FIG. 12, but are sized to permit some movement of the protrusion 25 within the cavity 68, while still functioning to retain the protrusion 25 within the cavity 68.

Figure 14:
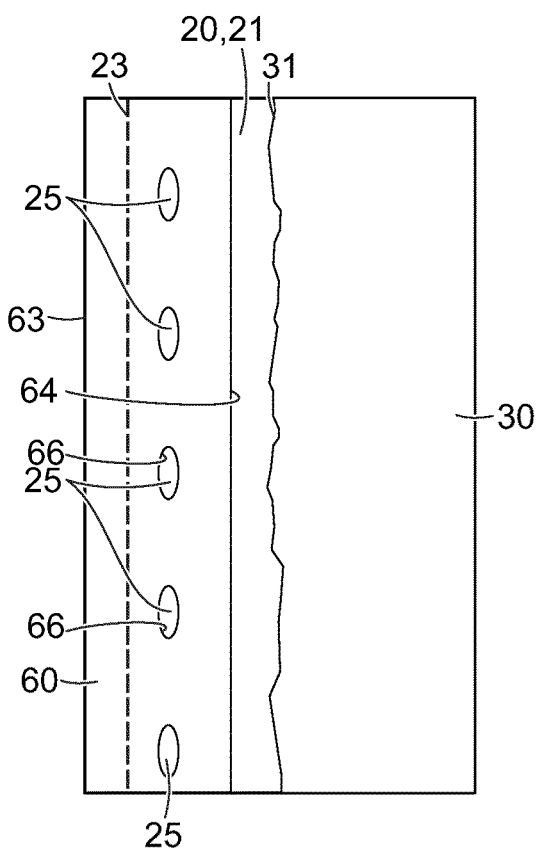
FIG. 14 is a cross-sectional view of a portion of the cell stack of FIG. 9 as seen along line 14-14 of FIG. 9.

Referring to FIG. 14, the substrate 20 of each cell 3 may include several protrusions 25 that are spaced apart along a line that extends in parallel to the substrate peripheral edge 23 so to surround a perimeter of the substrate 20.

Figure 15:
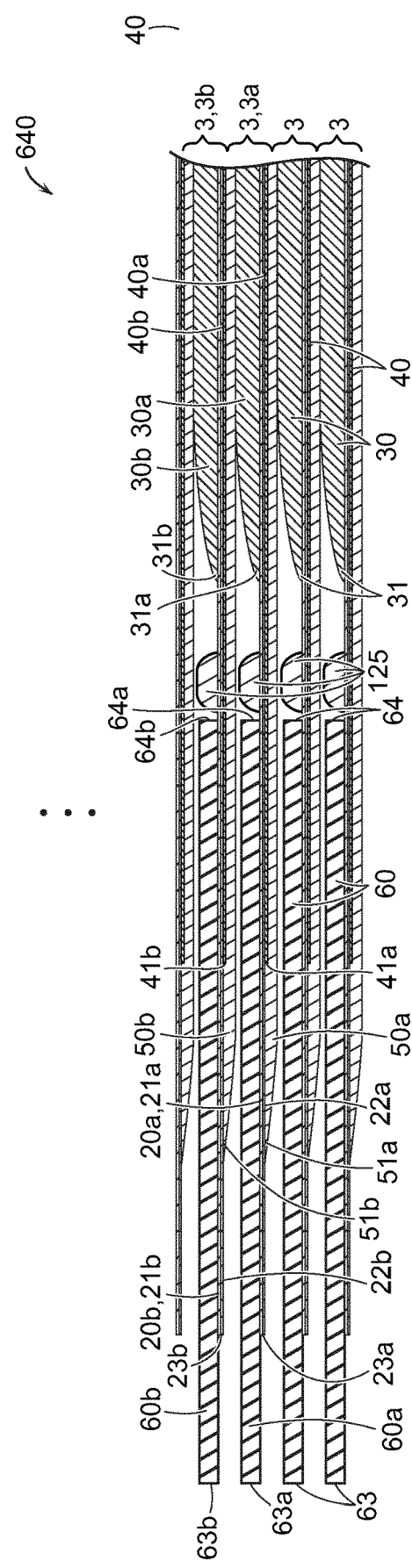
FIG. 15 is a cross-sectional view of a peripheral portion of another alternative embodiment cell stack.
Figure 16:
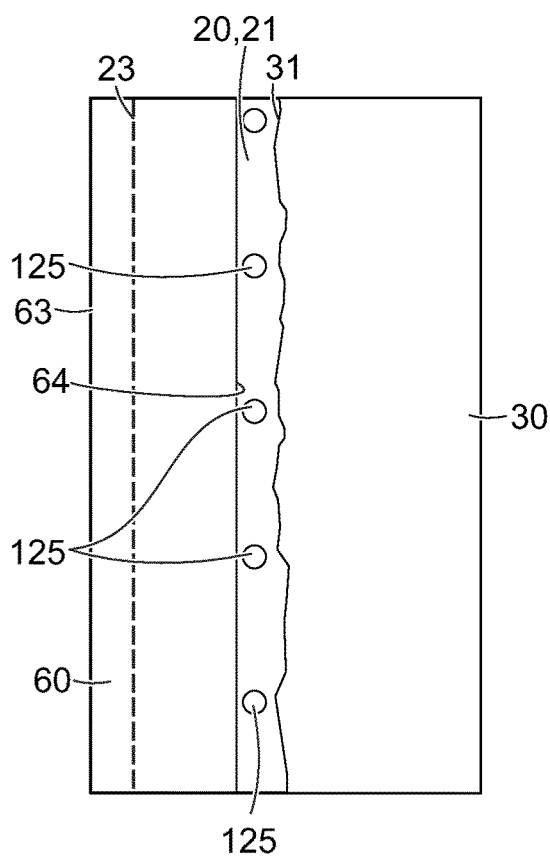
FIG. 16 is a cross-sectional view of a portion of the cell stack of FIG. 15 as seen along line 16-16 of FIG. 15.

Referring to FIGS. 15 and 16, in some embodiments, the edge insulating device 60 is free of through holes 66 and/or recesses 68. In these embodiments, the substrate 20 of the bipolar plate 12 may include surface features (for example, protrusions 125) that engage the edge insulating device inner peripheral edge 64 in such a way as to locate the edge insulating device 60 relative to the substrate 20. Like the previous embodiment, the several protrusions 125 arranged to be spaced apart along a line that extends in parallel to the substrate peripheral edge 23 so to surround a perimeter of the substrate 20. The protrusions 125 are positioned between the edge insulating device inner peripheral edge 64 and the first active material layer peripheral edge 31 to prevent contact between the edge insulating device 60 and the first active material layer 30, and particularly to locate the edge insulating device 60 and to maintain the spacing between the inner peripheral edge 64 of the edge insulating device 60 and the first active material layer peripheral edge 31 as discussed above.

Figure 17:
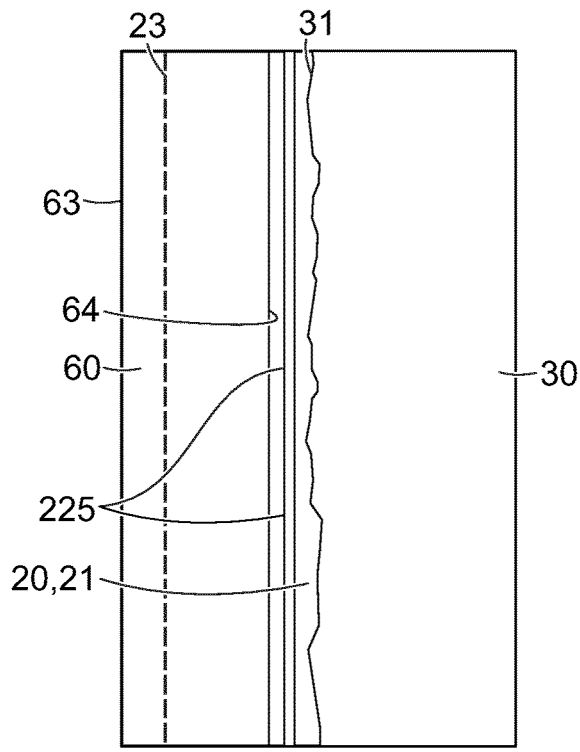
FIG. 17 is a cross-sectional view of an alternative embodiment of a portion of the cell stack of FIG. 15.

Referring to FIG. 17, in some embodiments, the edge insulating device inner peripheral edge 64 cooperates with an alternative embodiment surface feature 225 formed on the substrate first surface 21. For example, the alternative embodiment surface feature 225 may be a frame-shaped rim that protrudes from the substrate first surface 21 and is positioned so as to maintain the spacing between the inner peripheral edge 66 of the edge insulating device 60 and the first active material layer peripheral edge 31 as discussed above. The rim 225 may extend continuously (shown) or discontinuously (not shown) along the periphery of the edge insulating device 60.

Figure 18:
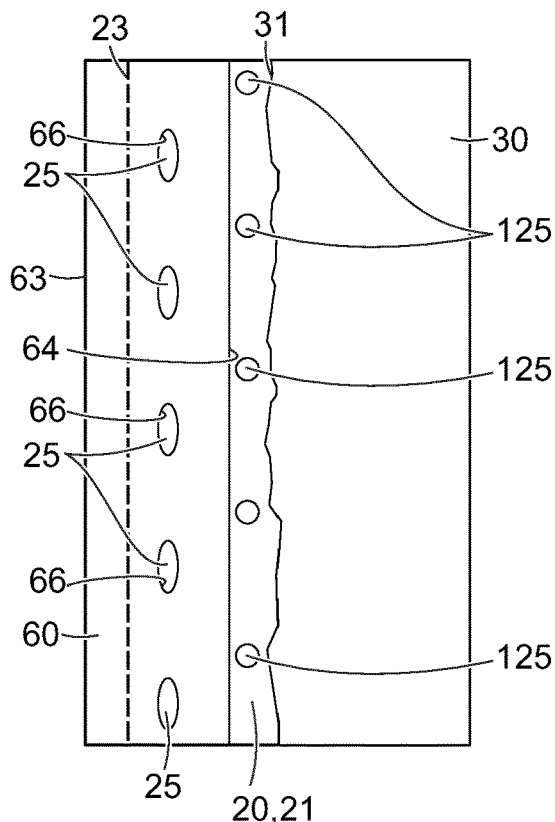
FIG. 18 is a cross-sectional view of another alternative embodiment of a portion of the cell stack of FIG. 15.

Referring to FIG. 18, the substrate 20 may include both locating surface features 25 that engage a corresponding surface feature 66 of the edge insulating device 60 and locating surface features 125 that engage the inner peripheral edge 64 of the edge insulating device 60, if required the specific application.

Although the locating surface features 25, 125 have been described here as provided on the first surface 21 (i.e., first surface 21a) of the cell 3 (cell 3a) with which the edge insulating device 60 is associated, it is understood that the locating surface features 25, 125 may alternatively be formed on the substrate 20b (i.e., the second surface 22b) of the adjacent cell 3b.

The protrusions 25, 125 may an integral part of the substrate surface, or may be formed thereon. For example, in some embodiments, the protrusions 25, 125 may be formed on the substrate surface in a screen printing process.

Figure 19:
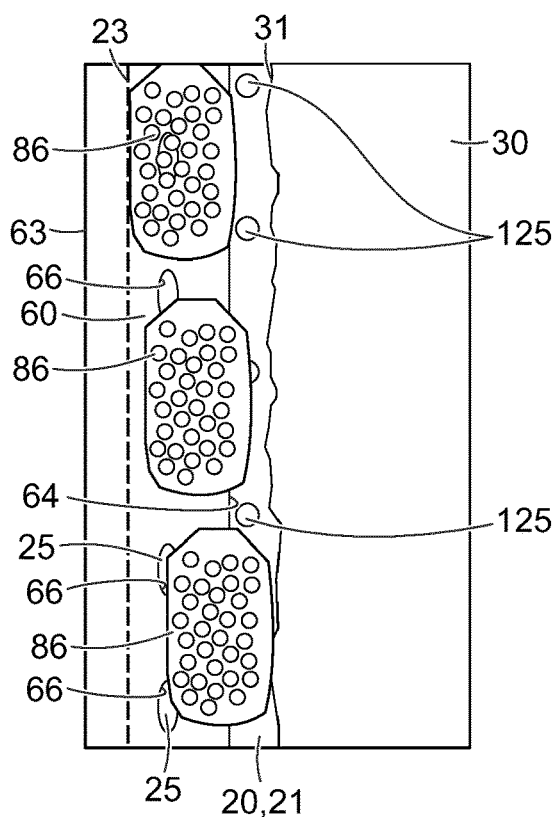
FIG. 19 is a cross-sectional view of another alternative embodiment of a portion of the cell stack of FIG. 15.

Referring to FIG. 19, in some embodiments the locating features 25, 66 may be combined with elastic add-on pads 86, which may be formed of closed pore foam rubber, or elastic circumferential strips (not shown). The pads 86 function to elastically fix and seal the edge insulating device 60 in combination with the substrate 20a of the cell 3a and/or the substrate 20b of the adjacent cell 3b, and hence the edge of the cell 3.

Referring to FIG. 20, in some embodiments, a support frame 90 is provided that receives and supports the outer peripheral edge 63 of each edge insulating device 60, maintains each outer peripheral edge 63 in a spaced apart relationship in a direction parallel to the stack axis 5 relative to the edge insulating device outer peripheral edges 63 of the adjacent cells, and provides sealing at the periphery of the edge sealing devices 60. The support frame 90 is disposed inside the battery housing 2 and surrounds the cell stack 4 in such a way that a gap g3 exists between the support frame 90 and the substrate peripheral edges 23.

The support frame 90 may be realized as an edge sealing tape (not shown) or a thick foam member 91 (FIG. 20). The foam member 91 is air and moisture impermeable, and extends about the circumference of the cell stack 4, and may also enclose both ends of the cell stack 4 whereby the cells 3 are sealed apart from the environment of the battery The support frame 90 receives and supports the outer peripheral edge 63 of each edge insulating device 60 of the cell stack 4. In some embodiments, the foam member 91 is elastic. In particular, the foam member 91 is sufficiently elastic to compensate for expansion and contraction of the cell stack 4 in a direction parallel to the stack axis 5 for example due to charge cycling. The support frame 90 is configured to maintain a spaced apart relationship between the respective outer peripheral edges 63 of the edge insulating devices 60 of adjacent cells 3, while leaving portions 69 of the edge insulating devices 60 unconstrained. The unconstrained portion 69 of an edge insulating device 60 is the portion that resides outside of the cell 3, e.g., beyond the peripheral edges 23 of the substrate 20, and inward with respect to the support frame 90.

Referring to FIG. 21, in embodiments in which the edge insulating device 63 extends outward beyond the substrate peripheral edge 23 a distance that is about 100 to 1000 or more times the cell thickness, the foam member 91 may be formed of materials that are less elastic or inelastic, and can include insulating materials, consisting of glue, polymer or a ceramic polymer hybrid sealing mass. In addition, the unconstrained portions 69 of the edge insulating devices 60 may be curved when the battery 1 is viewed in a cross section that is parallel to the stack axis 5. Thus, the edge insulating devices 60 may have a kind of folding wave. The excess material that is used to form the curve or wave is used to compensate for expansion and contraction of the cells 3 in a direction parallel to the stack axis 5 relative to the support frame 90, thus avoiding generation of tensile forces that would be generated if the foam member 91 were inelastic and prevented the edge insulating device outer peripheral edges 63 from movement in a direction parallel to the stack axis 5.

In other embodiments, the unconstrained portion 69 of the edge insulating device 60 of one cell 3 of the cell stack 4 may have a length that is different than the length of the unconstrained portion 69 of the edge insulating device 60 of another cell 3 of the cell stack 4. As used herein, the length of the unconstrained portion 69 is a distance between an inner surface of the support frame 90 and the peripheral edge 23 of the corresponding substrate 20. For example, the unconstrained portion 69 of a cell 3 that is disposed in a center (e.g., midway between the cell stack first end 6 and second end 8) of the cell stack 4 may have a shorter length than the unconstrained portion 69 of a cell 3 that is disposed at either the first end 6 or the second end 8 of the cell stack 4. By providing edge insulating devices 60 having unconstrained portions 69 of varying lengths, the cell stack 4, which experiences relatively greater displacement at the ends 6, 8 of the cell stack 4 than at a center of the cell stack 4, can easily accommodate expansions and contractions of the cell stack in a direction parallel to the stack axis 5 due to cell charge cycling.

In some embodiments, the outer peripheral edge 63 of the edge insulating device 60 of each cell 3 is fixed to the support frame 90. In addition, a length of the edge insulating device 60 (e.g., a distance between the outer peripheral edge 63 and the inner peripheral edge 64) is set so that the support frame 90 and the edge insulating device 60 cooperate to maintain a desired spacing between the edge insulating device inner peripheral edge 64 and the first active material layer peripheral edge 31. Since the edge insulating device 60 is fixed to the support frame 90, the edge insulating device 60 is prevented from a collision with the first active material layer 30. Thus, batteries 1 that employ the support frame 90 may be optionally be formed without the locating features 25, 125 described above with respect to FIGS. 9 and 15.

Figure 23:
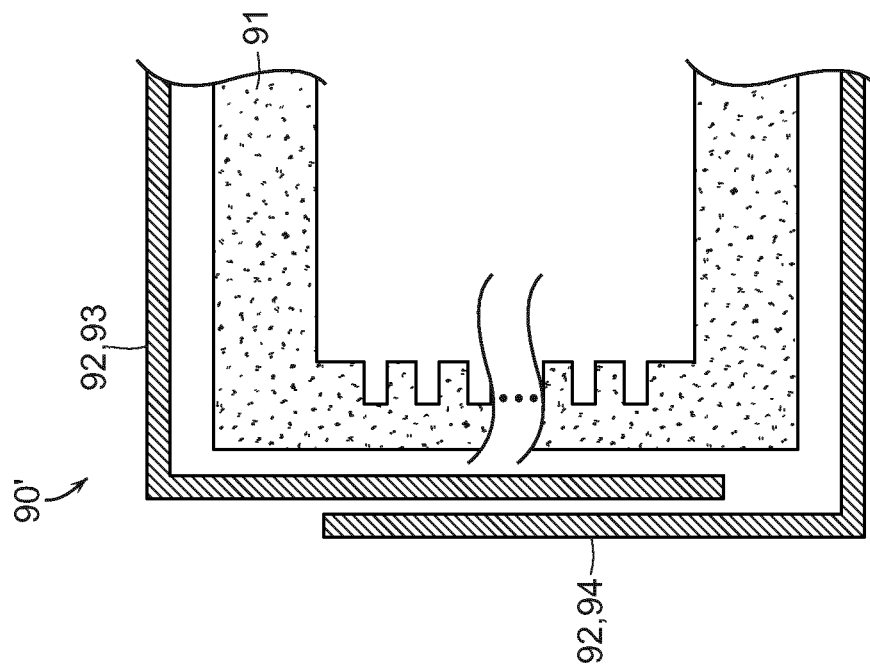
FIG. 23 is a cross sectional schematic view of the support frame of FIG. 20 disposed within an expandable outer frame member.
Figure 22:
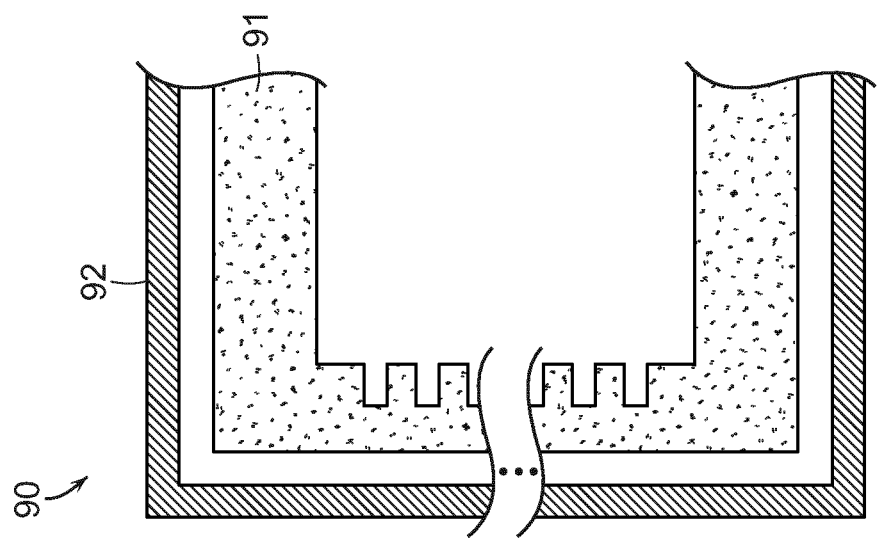
FIG. 22 is a cross sectional schematic view of the support frame of FIG. 20 disposed within a rigid outer frame member.

Referring to FIGS. 22 and 23, the support frame 90 may optionally include an outer frame member 92 that is rigid and encloses the foam member 91. The outer frame member 92 functions to prevent the compression of the foam member 91 by the battery housing 2. In some embodiments, for example those in which the foam member 91 is formed of an elastic material, the outer frame member 92 may have features that permit expansion of the outer frame member 92 in a direction parallel to the stack axis 5. Such features may include providing the outer frame member 92 as an assembly of two rigid, overlapping outer frame halves 93, 94 (FIG. 23). In other embodiments, for example those in which the foam member 91 is formed of an inelastic material, the outer frame member 92 may be a unitary structure that is rigid and incapable of expansion in a direction parallel to the stack axis 5 (FIG. 22).

Referring to FIG. 24, an alternative embodiment battery 200 is similar to the battery 100 described above with respect to FIG. 1, and common elements are referred to using common reference numbers. The battery 200 encloses a stacked arrangement of electrochemical cells 203. The cells 203 are identical to the cells 3 described above, except that the cells 203 do not include an edge insulating device 60. Instead, an insulating tape 260 is applied to the peripheral edge 23 of each substrate 20 and each current collector 102, 112, and extends along the entire perimeter of these structures.

For example, in some embodiments, the tape 260 is an electrical insulator that is thin and flexible, and has an adhesive supplied on one surface of the tape. For example, the tape 260 may be an adhesive backed polyamide tape such as Kapton™ tape. Kapton™ is a registered trademark of E. I. du Pont de Nemours and Company. The adhesive surface is used to secure the tape 260 to the electrical conductor (e.g., the substrate 20 and the current collectors 102, 112). Although the tape 260 could be applied to only one surface of the electrical conductor, it is more effective when wrapped around the edges of the electrical conductor so that it covers a periphery of the first and second surfaces 21, 22, as well as the cut or edge surfaces of the electrical conductor as shown. Moreover, although the tape 260 is illustrated as covering only the electrical conductor and not covering the solid electrolyte layer 50 or active material layers 30, 40, it is contemplated that the solid electrolyte layer 50 or active material layers 30, 40 could also be partially covered by the tape 260 if required.

Although the edge insulating device 60 has been described herein as part of a cell that has a solid electrolyte 50, the edge insulating device 60 is not limited to this type of cell. For example, the edge insulating device 60 can advantageously be used in a semi-solid state cell, for example, a cell with gel electrolyte with higher viscosity and lower flow properties. The edge insulating device 60 can also be used in cells having a liquid electrolyte, along with an additional liquid sealing elastic film on the top side of the edge sealing device. As elastic liquid electrolyte sealing layers, silicone gels and polymers are suitable.

In the embodiments described herein, the solid electrolyte layer 50 is disposed on the second surface 22 in such a way as to encapsulate the second active material layer 40, which in turn is described as providing an anode of the electrochemical cell 3. However, in other embodiments, the solid electrolyte layer 50 can be configured to encapsulate the first active material layer 30, which provides a cathode of the electrochemical cell 3.

In the embodiment illustrated in FIG. 5, the solid electrolyte 50 overlies the anode active material layer 40, and the edge insulating device 60 is secured directly to a peripheral portion of the solid electrolyte 50. However, the cell 3 is not limited to this configuration. For example, in other embodiments, the solid electrolyte 50 may overlie the cathode active material layer 30, and the edge insulating device 60 may be secured directly to a peripheral portion of the solid electrolyte 50. In any case, the cathode active material layer 30 does not touch the edge insulating device 60, in order to prevent forces on the active material layer 30 and thus prevent damage, for example by detaching it from the corresponding substrate.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

We claim:

1. A battery comprising a stacked arrangement of electrochemical cells, each electrochemical cell comprising
a bipolar plate that includes a substrate, a first active material layer disposed on a first surface of the substrate, and a second active material layer disposed on a second surface of the substrate, the second surface being opposed to the first surface, the first active material layer having a first active material layer peripheral edge that is spaced apart from, and disposed closer to a center of the substrate than, a substrate peripheral edge, the second active material layer being a material that is different than the material of the first active material layer, the second active material layer having a second active material layer peripheral edge that is spaced apart from the substrate peripheral edge,
a solid electrolyte layer that is disposed on the second surface so as to encapsulate the second active material layer including the second active material layer peripheral edge, and
an edge insulating device that includes a sheet of electrically insulating material, the edge insulating device including an outer peripheral edge and an inner peripheral edge, the edge insulating device being disposed between the peripheral edges of the substrates of a pair of adjacent cells in such a way that
the outer peripheral edge is disposed further from the center of the substrate than the substrate peripheral edge,
the edge insulating device physically contacts and is directly secured to the first surface of one cell of the pair of adjacent cells or the solid electrolyte layer of the other cell of the pair of adjacent cells,
the outer peripheral edge is spaced apart from, and disposed further from the center of the substrates than, the bipolar plate peripheral edge,
the inner peripheral edge is spaced apart from, and disposed closer to the center of the substrates than, the bipolar plate peripheral edge and the second active material layer peripheral edge, and
the inner peripheral edge is disposed further from the center of the substrates than the first active material layer peripheral edge,
wherein
when the edge insulating device physically contacts and is directly secured to the first surface of the one cell of the pair of adjacent cells, the edge insulating device is movable relative to the solid electrolyte layer of other cell of the pair of adjacent cells, and
when the edge insulating device physically contacts and is directly secured to the solid electrolyte layer of the other cell of the pair of adjacent cells, the edge insulating device is movable relative to the first surface of the one cell of the pair of adjacent cells.

2. The battery of claim 1, wherein the edge insulating device is secured to the solid electrolyte layer of the other cell of the pair of adjacent cells.

3. The battery of claim 2, wherein the edge insulating device is secured to the solid electrolyte layer of the other cell of the pair of adjacent cells via mechanical properties of an outer surface of the solid electrolyte layer.

4. The battery of claim 1, wherein the edge insulating device is secured to the first surface.

5. The battery of claim 1, wherein the edge insulating device has a shape of a frame when viewed in a direction parallel to a stacking direction of the cells.

6. The battery of claim 1, wherein the edge insulating device has a thickness that is less than a sum of the thicknesses of the first active material layer, the solid electrolyte layer and the second active material layer, regardless of the charge state of the cells, where the thickness corresponds to a dimension in a direction parallel to a stacking direction of the cells.

7. The battery of claim 1, wherein the inner peripheral edge of the edge insulating device
is spaced apart from and faces the first active material layer peripheral edge, and
is further from the center of the substrate than the peripheral edge of the first active material layer.

8. The battery of claim 1, further comprising a battery housing that encloses the stacked arrangement of cells, the battery housing configured to prevent humidity from entering an interior space of the battery housing.

9. The battery of claim 8, wherein the battery housing includes a flexible laminate material, the flexible laminate material including a metal foil that is sandwiched between polymer layers.

10. The battery of claim 1, wherein the substrate is a clad plate in which the first surface is an electrically conductive first material, and the second surface is electrically connected to the first surface and is an electrically conductive second material that is different than the first material.

\* \* \* \* \*